United States Patent [19]

Fornof

[11] Patent Number: 4,976,446

[45] Date of Patent: Dec. 11, 1990

[54] REACTOR COOLANT PUMP AUXILIARY SEAL FOR REACTOR COOLANT SYSTEM VACUUM DEGASIFICATION

[75] Inventor: James D. Fornof, Pittsburgh, Pa.

[73] Assignee: Westinghouse Electric Corp., Pittsburgh, Pa.

[21] Appl. No.: 351,135

[22] Filed: May 9, 1989

Related U.S. Application Data

[62] Division of Ser. No. 222,649, Jul. 21, 1988, Pat. No. 4,847,041.

[51] Int. Cl.[5] .......................... F16J 15/16; F16J 15/38
[52] U.S. Cl. .................................. 277/198; 277/81 R; 277/81 S; 277/192
[58] Field of Search ..................... 277/81 S, 81 R, 192, 277/198

[56] References Cited

U.S. PATENT DOCUMENTS

| | | | |
|---|---|---|---|
| 820,780 | 5/1906 | Guy | 277/65 |
| 1,315,677 | 9/1919 | McNab | 277/65 |
| 2,850,311 | 9/1958 | Mansfield | 277/192 |
| 2,921,806 | 1/1960 | Carter | 277/81 S X |
| 3,006,667 | 10/1961 | Stephens | 277/192 X |
| 3,072,414 | 1/1963 | Porges | 277/93 R |
| 3,081,096 | 3/1963 | Woodbury | 277/58 |
| 3,379,444 | 4/1968 | Brummer et al. | 277/58 |
| 3,386,746 | 6/1968 | Liebig | 277/207 |
| 3,522,948 | 8/1970 | MacCrum | |
| 3,529,838 | 9/1970 | Singleton | |
| 3,632,117 | 1/1969 | Villesar | 277/3 |
| 3,675,933 | 7/1972 | Nappe | 279/9 |
| 3,720,222 | 3/1973 | Andrews et al. | 137/154 |
| 4,275,891 | 6/1981 | Boes | 277/96.1 |
| 4,410,188 | 10/1983 | Copes | 277/65 |
| 4,575,098 | 3/1986 | Escue | 277/9 |
| 4,647,425 | 3/1987 | Battaglia et al. | 376/308 |
| 4,858,936 | 8/1989 | Adams | 277/192 X |

FOREIGN PATENT DOCUMENTS 1190750  4/1965  Fed. Rep. of Germany .

Primary Examiner—Allan N. Shoap

[57] ABSTRACT

An auxiliary seal for preparing a reactor coolant pump for vacuum degasification of the reactor coolant system includes at least a pair of sealing segments. The sealing segments are composed of metal and have semi-circular shaped bodies with attaching ears and an anchoring flange fixed thereon. The attaching ears extend radially outward from opposite ends of the sealing segment bodies. The ears on one segment body when aligned with and attached by fasteners to the ears on the other segment body draw the sealing segments together in releasably attached relation to one another and in sealing and clamping engagement about a shaft of the pump. The segment bodies also have interior and exterior circumferential recesses with O-rings therein which seal respectively with a portion of the pump shaft and a portion of a housing of the pump. The annular flange extends radially outward from the sealing segment bodies and is attachable to the housing portion for anchoring the seal segments thereto.

13 Claims, 4 Drawing Sheets

REACTOR COOLANT PUMP AUXILIARY SEAL FOR REACTOR COOLANT SYSTEM VACUUM DEGASIFICATION

This is a division of application Ser. No. 222,649, filed July 21, 1988, now U.S. Pat. No. 4,847,041, issued July 11, 1989.

CROSS REFERENCE TO RELATED APPLICATIONS

Reference is hereby made to the following copending applications dealing with related subject matter and assigned to the assignee of the present invention:

1. "Sealing Devices For The Drive Shaft Of A High Pressure Fluid Pump" by N. Bonhomme, assigned U. S. Ser. No. 379,196 and filed May 17, 1982 now U.S. Pat. No. 4,587,076, issued May 6, 1986.

2. "Nuclear Reactor Coolant Pump Impeller/Shaft Assembly" by L. S. Jenkins, assigned U. S. Ser. No. 761,447 and filed Aug. 1, 1985 now U.S. Pat. No. 4,690,612, issued Sept. 1, 1987.

3. "Improved Shaft Seal" by K. P. Quinn, assigned U. S. Ser. No. 739,745 and filed May 31, 1985 now U.S. Pat. No. 4,693,481, issued Sept. 15, 1987.

4. "Reactor Coolant Pump Hydrostatic Sealing Assembly With Improved Hydraulic Balance" by R. F. Guardiani et al, assigned U. S. Ser. No. 063,331 and filed June 17, 1987 now U.S. Pat. NO. 4,838,559, issued June 13, 1989.

5. "Reactor Coolant Pump Sealing Surface With Titanium Nitride Coating" by G. Zottola, assigned U. S. Ser. No. 035,832 and filed Apr. 8, 1987 now U.S. Pat. No. 4,871,297, issued Oct. 3, 1989.

6. "Reactor Coolant Pump Hydrostatic Sealing Assembly With Externally Pressurized Hydraulic Balance Chamber" by C. P. Nyilas et al, assigned U. S. Ser. No. 091,224 and filed Aug. 31, 1987 now U.S. Pat. No. 4,848,774, issued July 18, 1989.

7. "Reactor Coolant Pump Shaft Seal Utilizing Shape Memory Metal" by David J. Janocko, assigned U.S. Ser. No. 197,174 and filed May 23, 1988.

BACKGROUND OF THE INVENTION

Field of the Invention

The present invention relates generally to shaft seals and, more particularly, is concerned with a reactor coolant pump auxiliary seal for reactor coolant system vacuum degasification.

Description of the Prior Art

In pressurized water nuclear power plants, a reactor coolant system is used to transport heat from the reactor core to steam generators for the production of steam. The steam is then used to drive a turbine generator. The reactor coolant system includes a plurality of separate cooling loops, each connected to the reactor core and containing a steam generator and a reactor coolant pump.

The reactor coolant pump typically is a vertical, single stage, centrifugal pump designed to move large volumes of reactor coolant at high temperatures and pressures, for example 550 degrees F. and 2500 psi. The pump basically includes three general sections from bottom to top—hydraulic, shaft seal and motor sections. The lower hydraulic section includes an impeller mounted on the lower end of a pump shaft which is operable within the pump casing to pump reactor coolant about the respective loop. The upper motor section includes a motor which is coupled to drive the pump shaft. The middle shaft seal section includes three tandem sealing assemblies—lower primary, middle secondary and upper tertiary sealing assemblies. The sealing assemblies are located concentric to, and near the top end of, the pump shaft. Their combined purpose is to mechanically contain the high positive pressure coolant of the reactor coolant system from leakage along the pump shaft to the containment atmosphere during normal operating condition. Representative examples of pump shaft sealing assemblies known in the prior art are the ones disclosed in U. S. Pat. Nos. to MacCrum (3,522,948), Singleton (3,529,838), Villasor (3,632,117), Andrews et al (3,720,222) and Boes (4,275,891) and in the first three patent applications cross-referenced above, all of which are assigned to the same assignee as the present invention.

Thus, the sealing assemblies in the reactor coolant pumps are designed to hold high positive coolant pressures. This fact has raised some concerns about possibility of damage being done to the reactor coolant pumps during reactor coolant system vacuum degasification. Procedures for vacuum degasification of the reactor coolant system are described in U.S. Pat. No. 4,647,425 to Battaglia et al, which is assigned to the same assignee as the present invention. Basically, in vacuum degasification of the reactor coolant system a vacuum or negative pressure is imposed on the system and thus on the reactor coolant pumps. This, in effect, pressurizes the pumps in reverse. One major concern is that reverse pressurization might draw the water used to cool the pump sealing assemblies back into the pump sealing assemblies by a reverse flow of the water through filters which might bring contamination in the form of dirt and foreign matter along with the water from the filters into the sealing assemblies. Then, when the pumps are restarted after conclusion of vacuum degasification, the sealing assemblies might become damaged by the presence of the contamination therein.

Consequently, a need exists for an effective way to prevent reverse pressurization of the reactor coolant pumps so as to eliminate these concerns about possible damage to the pump sealing assemblies.

SUMMARY OF THE INVENTION

The present invention provides a reactor coolant pump auxiliary seal designed to satisfy the aforementioned needs. The auxiliary seal of the present invention provides a simple and effective way to prepare the reactor coolant pumps so that the reactor coolant system can be vacuum degasified without applying a reverse pressure to the pump sealing assemblies. The auxiliary seal is an external, temporary seal that would be installed prior to the start of vacuum degasification between the pump sealing housing and shaft, and then removed after degasification is completed. The auxiliary seal accepts the entire reverse pressure, thus preventing any possible damage to the primary, secondary and tertiary pump sealing assemblies of the pump.

Accordingly, the present invention is directed to an auxiliary seal useful in a reactor coolant pump for preparing the pump for vacuum degasification of the reactor coolant system. The auxiliary seal comprises: (a) sealing segments having arcuate and, preferably semi-circular, shaped bodies; (b) means for releasably attaching the sealing segment bodies together so as to adapt interior circumferential portions thereof for sealing and clamping engagement with and about a shaft of the pump and so as to adapt exterior circumferential portions of the segments for sealing engagement with an interior portion of a housing of the pump; and (c) means for releasably anchoring the sealing segment bodies to the pump housing.

More particularly, the attaching means include ears fixed on the sealing segment bodies and extending radially outward from adjacent opposite ends thereof. The ears on one segment body are alignable with and attachable by fasteners to the ears on the other segment body for drawing the sealing segment bodies together in attached relation to one another and in sealing and clamping engagement about the shaft. Preferably, a gasket element is placed and clamped between the clamped opposite ends of the sealing segment bodies.

Further, the interior and exterior circumferential portions of the sealing segment bodies have circumferential recesses defined therein. O-rings are seated in the recesses of the sealing segment bodies for providing the sealing relation with the pump shaft. Also, the anchoring means includes an annular flange fixed on and extending radially outward from the sealing segment bodies. The flange is adapted for attachment to the pump housing for anchoring the clamped together sealing segment bodies thereto.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
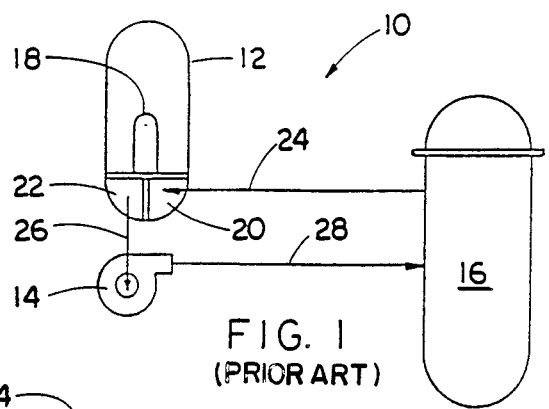
FIG. 1 is a schematic representation of one cooling loop of a conventional nuclear reactor coolant system which includes a steam generator and a reactor coolant pump connected in series in a closed coolant flow circuit with the reactor core.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Prior Art Reactor Coolant Pump

Referring now to the drawings, and particularly to FIG. 1, there is shown a schematic representation of one of a plurality of cooling loops 10 of a conventional nuclear reactor coolant system. The cooling loop 10 includes a steam generator 12 and a reactor coolant pump 14 serially connected in a closed coolant flow circuit with a nuclear reactor core 16. The steam generator 12 includes primary tubes 18 communicating with inlet and outlet plenums 20,22 of the generator. The inlet plenum 20 of the steam generator 12 is connected in flow communication with the outlet of the reactor core 16 for receiving hot coolant therefrom along flow path 24 of the closed flow circuit. The outlet plenum 22 of the steam generator 12 is connected in flow communication with an inlet suction side of the reactor coolant pump 14 along flow path 26 of the closed flow circuit. The outlet pressure side of the reactor coolant pump 14 is connected in flow communication with the inlet of the reactor core 16 for feeding cold coolant thereto along flow path 28 of the closed flow circuit.

In brief, the coolant pump 14 pumps the coolant under high pressure about the closed flow circuit. Particularly, hot coolant emanating from the reactor core 16 is conducted to the inlet plenum 20 of the steam generator 12 and to the primary tubes 18 in communication therewith. While in the primary tubes 18, the hot coolant flows in heat exchange relationship with cool feedwater supplied to the steam generator 12 via conventional means (not shown). The feedwater is heated and portions thereof changed to steam for use in driving a turbine generator (not shown). The coolant, whose temperature has been reduced by the heat exchange, is then recirculated to the reactor core 16 via the coolant pump 14.

The reactor coolant pump 14 must be capable of moving large volumes of reactor coolant at high temperatures and pressures about the closed flow circuit. Although, the temperature of the coolant flowing from the steam generator 12 to the pump 14 after heat exchange has been cooled substantially below the temperature of the coolant flowing to the steam generator 12 from the reactor core 16 before heat exchange, its temperature is still relatively high, being typically about 550 degrees F. The coolant pressure produced by the pump is typically about 2250 psi.

Figure 2:
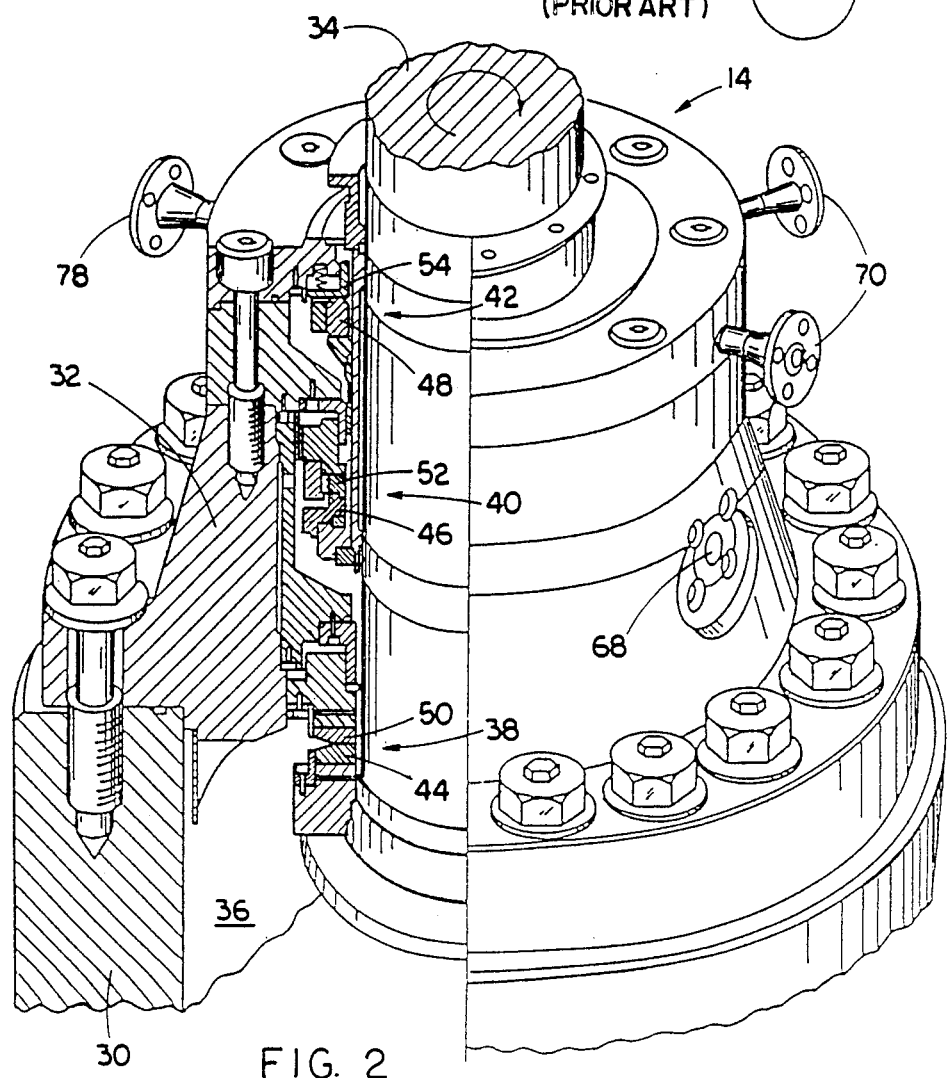
FIG. 2 is a cutaway perspective view of the shaft seal section of a reactor coolant pump, illustrating in cross-section the seal housing and the lower primary, middle secondary and upper tertiary sealing assemblies which are disposed within the seal housing and surround the pump shaft in this section of the pump.
Figure 3:
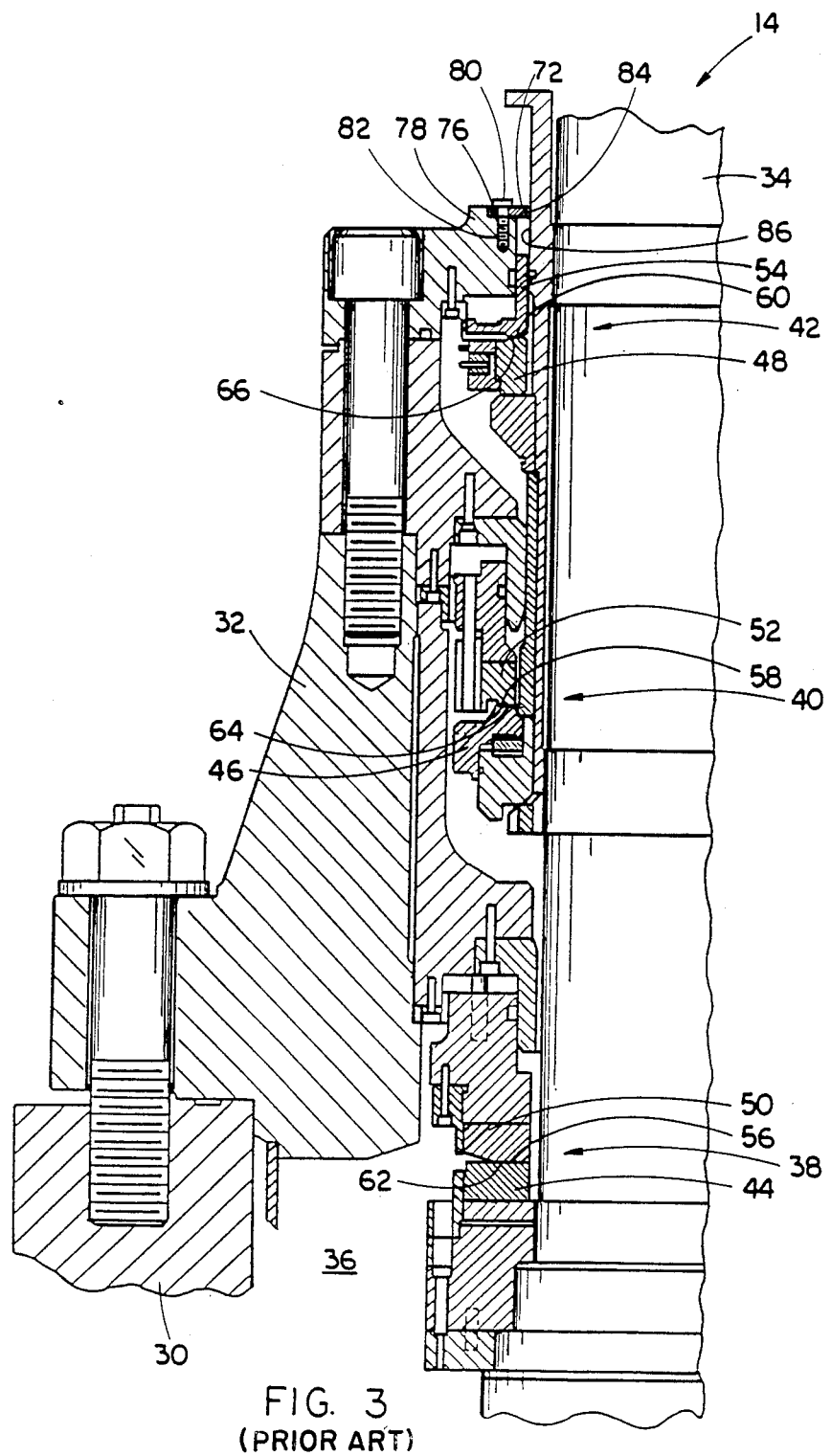
FIG. 3 is an enlarged view of the cross-sectioned seal housing and sealing assemblies of the reactor coolant pump of FIG. 2.

As seen in FIGS. 2 and 3, the prior art reactor coolant pump 14 generally includes a pump housing 30 which terminates at one end in a seal housing 32. The pump 14 also includes a pump shaft 34 extending centrally of the housing 30 and being sealingly and rotatably mounted within the seal housing 32. Although not shown, the bottom portion of the pump shaft 34 is connected to an impeller, while a top portion thereof is connected to a high-horsepower, induction-type electric motor. When the motor rotates the shaft 34, the impeller within the interior 36 of the housing 30 circulates the coolant flowing through the pump housing 30 at pressures from ambient to approximately 2250 psi cover gas. This pressurized coolant applies an upwardly directed, hydrostatic load upon the shaft 34 since the outer portion of the seal housing 32 is surrounded by the ambient atmosphere.

In order that the pump shaft 34 might rotate freely within the seal housing 32 while maintaining the 2250 psi pressure boundary between the housing interior 36 and the outside of the seal housing 32, tandemly-arranged lower primary, middle secondary and upper tertiary sealing assemblies 38,40,42 are provided in the positions illustrated in FIGS. 2 and 3 about the pump shaft 34 and within the pump housing 30. The lower primary sealing assembly 38 which performs most of the pressure sealing (approximately 2250 psi) is of the non-contacting hydrostatic type, whereas the middle secondary and upper tertiary sealing assemblies 40,42 are of the contacting or rubbing mechanical type.

Each of the sealing assemblies 38,40,42 of the pump 14 generally includes a respective annular runner 44,46,48 which is mounted to the pump shaft 34 for rotation therewith and a respective annular seal ring 50,52,54 which is stationarily mounted within the seal housing 32. The respective runners 44,46,48 and seal rings 50,52,54 have top and bottom end surfaces 56,58,60 and 62,64,66 which face one another. The facing surfaces 56,62 of the runner 44 and seal ring 50 of the lower primary sealing assembly 38 normally do not contact one another but instead a film of fluid normally flows between them. On the other hand, the facing surfaces 58,64 and 60,66 of the runners and seal rings 46,52 and 48,54 of the middle secondary and upper tertiary sealing assemblies 40 and 42 normally contact or rub against one another.

Because the primary sealing assembly 38 normally operates in a film-riding mode, some provision must be made for handling coolant fluid which "leaks off" in the annular space between the seal housing 32 and the shaft 34 rotatably mounted thereto. Accordingly, the seal housing 32 includes a primary leakoff port 68, whereas leakoff ports 70 accommodate coolant fluid leakoff from secondary and tertiary sealing assemblies 40,42.

Also, the reactor coolant pump 14 has an annular fluid blocking splash guard 72 disposed adjacent to an annular collar 74 attached to the pump shaft 34. The splash guard 72 is seated within an annular recess 76 formed about an upper portion 78 of the seal housing 32. Screws 80 (only one of which is shown) threaded into holes 82 tapped in the seal housing portion 78 serve to attach the splash guard 72 to the seal housing 32 and retain it in the recess 76 such that an inner periphery 84 of the splash guard 72 is disposed close to the exterior cylindrical surface 86 of the shaft collar 74.

Reactor Coolant Pump Auxiliary Seal of the Present Invention

Figures 4, 5:
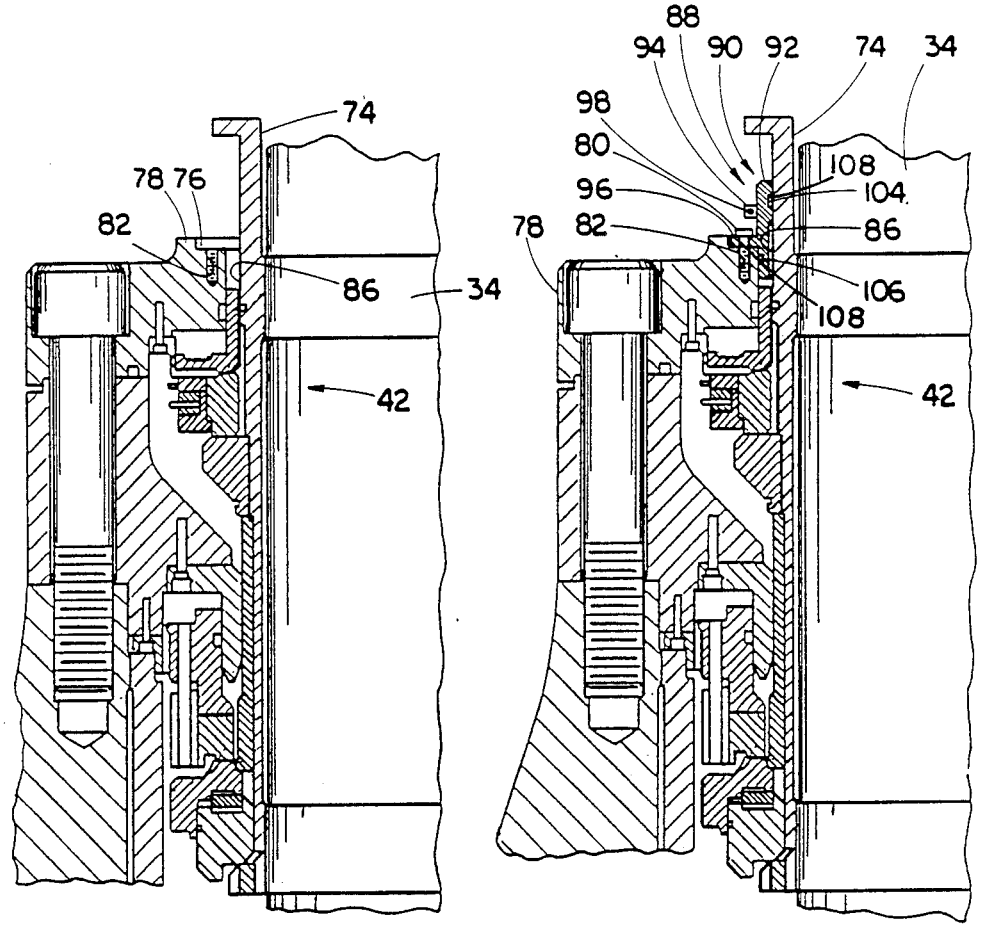
FIG. 4 is an enlarged fragmentary cross-sectional view of an upper portion of the sealing housing of the reactor coolant pump of FIG. 3, illustrating a splash guard removed therefrom.
FIG. 5 is another enlarged fragmentary cross-sectional view similar to FIG. 4 but showing the auxiliary seal of the present invention now temporarily situated at the mounting location of the removed splash guard.

In accordance with principles of the present invention, to prepare the reactor coolant pump 14 for reactor coolant system vacuum degasification, a vibration probe bracket (not shown) and the splash guard 72 are removed from attachment to the seal housing upper portion 78, as seen in FIG. 4, and temporarily replaced by an auxiliary seal 88 of the present invention, as seen in FIG. 5.

Figure 6:
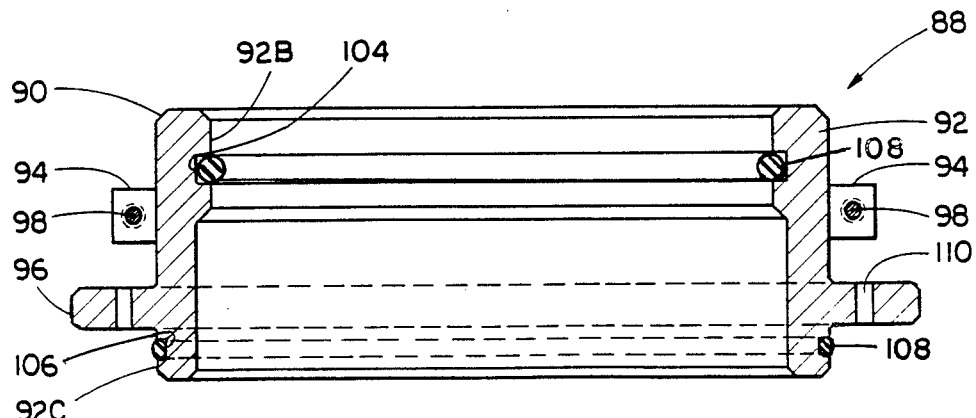
FIG. 6 is an enlarged fragmentary axial sectional view of the auxiliary seal of FIG. 5 shown by itself.
Figure 7:
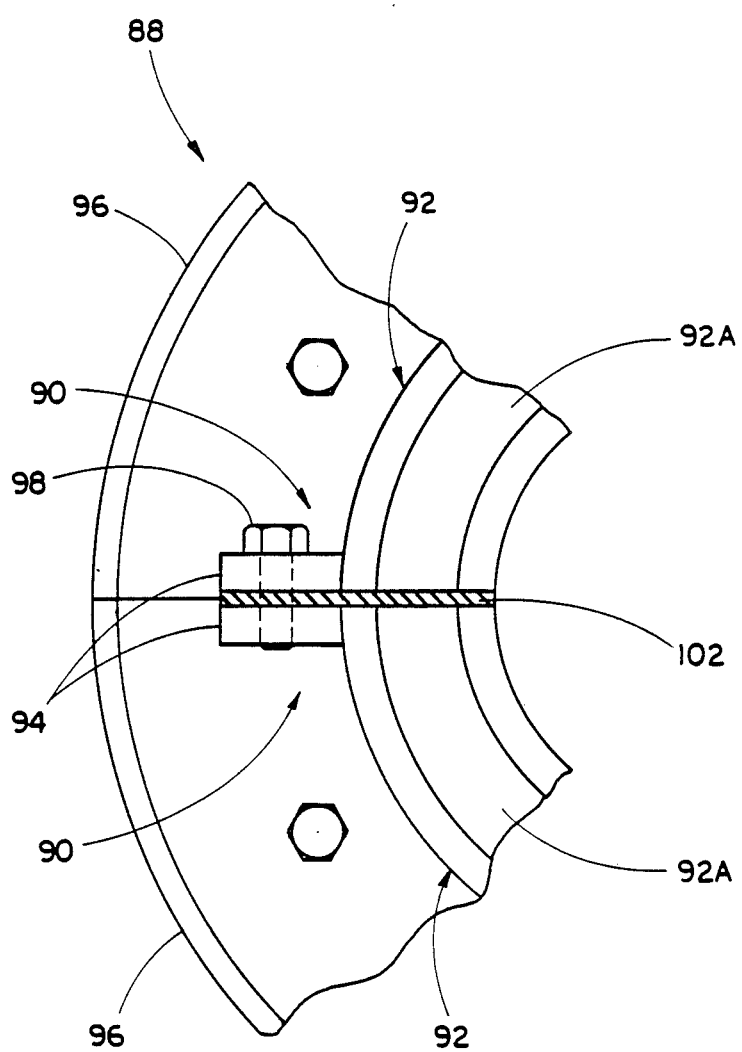
FIG. 7 is an enlarged fragmentary top plan view of the auxiliary seal of FIG. 6.

Referring now to FIGS. 5 to 7, the auxiliary seal 88 preferably includes a pair of sealing segments 90 having respective arcuate and, preferably semi-circular, shaped bodies 92 with means in the form of lugs or ears 94 fixed thereon for releasably attaching the sealing segment bodies 92 together and means in the form of an annular flange 96 fixed thereon for releasably anchoring the sealing segment bodies 92 to the upper portion 78 of the seal housing 32 of the pump 14.

More particularly, the attaching ears 94, preferably two per body, are fixed on the sealing segment bodies 92 so as to extend radially outward from adjacent opposite ends 92A of the bodies. The ears 94 on one segment body 92 (only one ear being shown on each body end 92A in FIG. 7) are alignable with and attachable by fasteners 98 (only one fastener shown in FIG. 7 in the form of a capscrew) to the ears 94 on the other segment body 92. Upon threading the fasteners 98 into the aligned ears 94, the sealing segment bodies 92 are drawn together into attached relation with one another and in sealing and clamping engagement about the pump shaft 34. Specifically, interior circumferential portions 92B of the segment bodies 92 are brought into sealing and clamping engagement with and about the pump shaft 34, whereas exterior circumferential portions 92C of the segment bodies 92 make sealing engagement with an interior surface 100 of the upper portion 78 of the pump seal housing 32. As seen in FIG. 7, preferably, a gasket element 102 is placed and clamped between the clamped opposite ends 92A of the sealing segment bodies 92.

Further, the interior and exterior circumferential portions 92B,92C of the sealing segment bodies 92 have circumferential recesses 104,106 defined therein. O-rings 108 are seated in the recesses 104,106 of the sealing segment bodies 92 for providing the sealing relation with the pump shaft 34.

Finally, the anchoring annular flange 96 is fixed on segment bodies 92 so as to extend radially outward therefrom. The annular flange 96 has holes 110 therethrough adapting them to align with the holes 82 in the upper seal housing portion 78 and receive screws 80 for attaching the flange 96 and thus anchoring the segment bodies 92 to the pump seal housing 32, as depicted in FIG. 5.

In summary, the auxiliary seal 88 is thus an external, temporary seal that is installed prior to the start of reactor coolant system vacuum degasification. It provides a seal between the pump seal housing 32 and the pump shaft 34. With proper external interface changes, i.e., isolation of all seal leakoff and bypass lines, the auxiliary seal 88 will accept the entire reverse pressure (for instance, 3 psi), thus preventing possible damage to the sealing assemblies 38,40,42 of the pump 14. After completion of vacuum degasification, the plant interfaces would be returned to normal, the auxiliary seal 88 removed and the vibration probe bracket and splash guard 72 replaced, and reactor coolant pump start-up resumed in a normal fashion. For details of the steps involved in carrying out vacuum degasification, attention is directed to the aforementioned U.S. Pat. No. 4,647,425 patent to Battaglia et al, which is assigned to the same assignee as the present invention and the disclosure of which is incorporated herein by reference thereto.

The auxiliary seal 88 could be fabricated from stainless or chrome plated carbon steel. Although the installed seal 88 is cylindrical in shape, it is composed of two saw-cut segments 90 to allow its assembly around the pump shaft 34 as described above. The space between the ends 92A of the two seal halves or segments 90 are resealed by use of gasket elements 102, composed of either rubber or neoprene for example, glued to the saw-cut faces of the segment ends. To install the O-rings 108, they would be wedge cut and glued back together after being positioned respectively about the pump shaft 34 (i.e., the collar 74) and the attached seal segments 90.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

What is claimed:

1. An auxiliary seal for a reactor coolant pump, said seal comprising:
   (a) sealing means adapted to be fitted about a shaft of the pump, said sealing means including at least a pair of sealing segments having arcuate shaped bodies and opposite ends;
   (b) means for releasably attaching said sealing segments together at their opposite ends so as to provide the interior circumferential portions of said ends for sealing and clamping engagement with and about the shaft of the pump and so as to provide exterior circumferential portions of said ends for sealing engagement with an interior portion of a housing of the pump;
   (c) means for releasably anchoring said sealing means to the pump housing adjacent to the pump shaft;
   (d) gasket elements placed and clamped between said respective opposite ends of said attached sealing segment bodies; and
   (e) said seal being auxiliary to a mechanical face sealing structure defined by two opposed sealing rings sealing along an interface and one ring rotating relative to the other, said seal being axially offset from the sealing structure relative to the axis of the shaft.

2. The auxiliary seal as recited in claim 1, wherein said interior and exterior circumferential portions of said sealing segment bodies have circumferential recesses defined therein.

3. An auxiliary seal for a reactor coolant pump, said seal comprising:
   (a) at least a pair of sealing segments having arcuate shaped sealing bodies and opposite ends;
   (b) means for releasably attaching said sealing segment bodies together so as to provide interior circumferential portions thereof for sealing and clamping engagement with and about a shaft of the pump and so as to provide exterior circumferential portions of said bodies for sealing engagement with an interior portion of a housing of the pump;
   (c) said attaching means including ears fixed on said sealing segment bodies and extending radially outward from said opposite ends of said bodies, said ears on one segment body being alignable with and attachable to said ears on the other segment body for drawing said sealing segment bodies together in attached relation to one another and in said sealing and clamping engagement about the shaft;
   (d) gasket elements placed and clamped between said respective opposite ends of said attached sealing segment bodies and said ears extending radially outward from said bodies
   (e) means for releasably anchoring said sealing segment bodies to the pump housing adjacent to the pump shaft; and
   (f) said seal being auxiliary to a mechanical face sealing structure defined by two opposed sealing rings sealing along an interface and one ring rotating relative to the other, said seal being axially offset from the sealing structure relative to the axis of the shaft.

4. The auxiliary seal as recited in claim 3, wherein said attaching means further includes fasteners for attaching said aligned ears together.

5. The auxiliary seal as recited in claim 3, wherein said interior and exterior circumferential portions of said sealing segment bodies have circumferential recesses defined therein.

6. The auxiliary seal as recited in claim 5, further comprising:
   a plurality of O-rings seated in said recesses of said sealing segment bodies for providing said sealing engagement with the pump shaft.

7. The auxiliary seal as recited in claim 3, wherein said anchoring means includes an annular flange fixed on and extending radially outward from each of said sealing segment bodies, each flange being attachable to the pump housing for anchoring said sealing segment bodies to said pump housing.

8. The auxiliary seal as recited in claim 3, wherein said sealing segment bodies are semi-circular shaped.

9. In a reactor coolant pump for a reactor coolant system having a stationary housing with an annular portion defining an opening and a shaft extending through said housing opening in spaced relation to said housing annular portion, an auxiliary seal for sealing said housing opening between said housing annular portion and said shaft for facilitating performance of vacuum degasification procedures on the reactor coolant system, said auxiliary seal comprising:
   (a) a pair of sealing segments having semi-circular shaped sealing bodies and opposite ends;
   (b) means for releasably attaching said sealing segment bodies together to dispose interior circumferential portions of said bodies in sealing and clamping engagement with and about said shaft and to dispose exterior circumferential portions of said bodies in sealing engagement with said housing annular portion; and
   (c) said attaching means including ears fixed on said sealing segment bodies and extending radially outward from said opposite ends of said bodies, said ears on one segment body being alignable with and attachable to said ears on the other segment body for drawing said sealing segment bodies together in attached relation to one another and in said sealing and clamping engagement about the shaft;
   (d) gasket elements placed and clamped between said respective opposite ends of said attached sealing segment bodies and said ears extending radially outward from said bodies
   (e) means for releasably anchoring said sealing segment bodies to said housing annular portion; and
   (f) said seal being auxiliary to a mechanical face sealing structure defined by two opposed sealing rings sealing along an interface and one ring rotating relative to the other, said seal being axially offset from the sealing structure relative to the axis of the shaft.

10. The auxiliary seal as recited in claim 9, wherein said attaching means further includes fasteners for attaching said aligned ears together.

11. The auxiliary seal as recited in claim 9, wherein said interior and exterior circumferential portions of said sealing segment bodies have circumferential recesses defined therein.

12. The auxiliary seal as recited in claim 11, further comprising:
a plurality of O-rings seated in said recesses of said sealing segment bodies for providing said sealing engagement with the pump shaft.

13. The auxiliary seal as recited in claim 9, wherein said anchoring means includes an annular flange fixed on and extending radially outward from each of said sealing segment bodies, each flange being attachable to said housing portion for anchoring said sealing segment bodies to said housing portion.

* * * * *